June 16, 1942.  S. P. ROCKWELL  2,287,008
HEAT TESTING APPARATUS FOR METAL OR SOLID OBJECTS
Filed Oct. 20, 1939  2 Sheets-Sheet 2
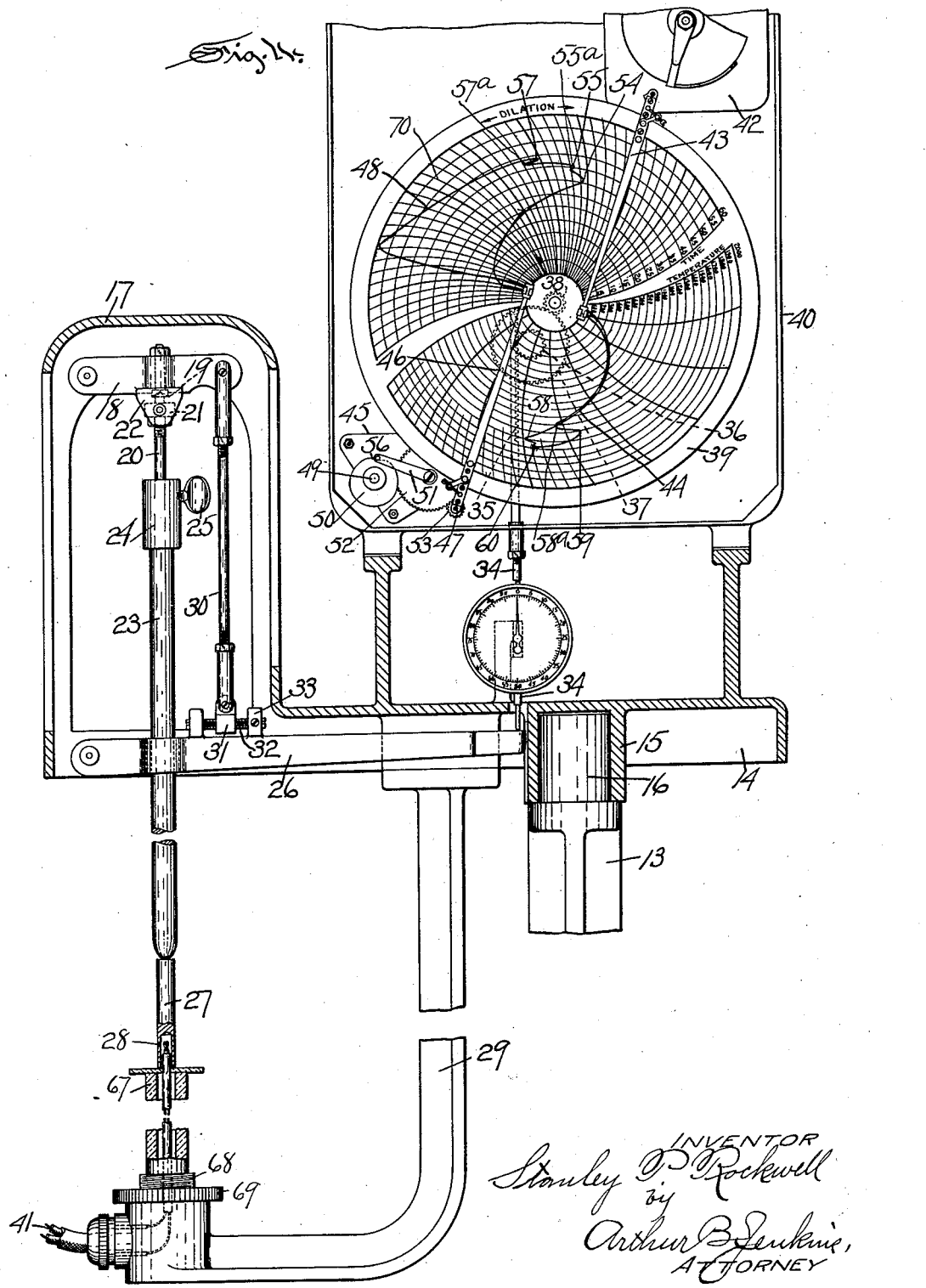

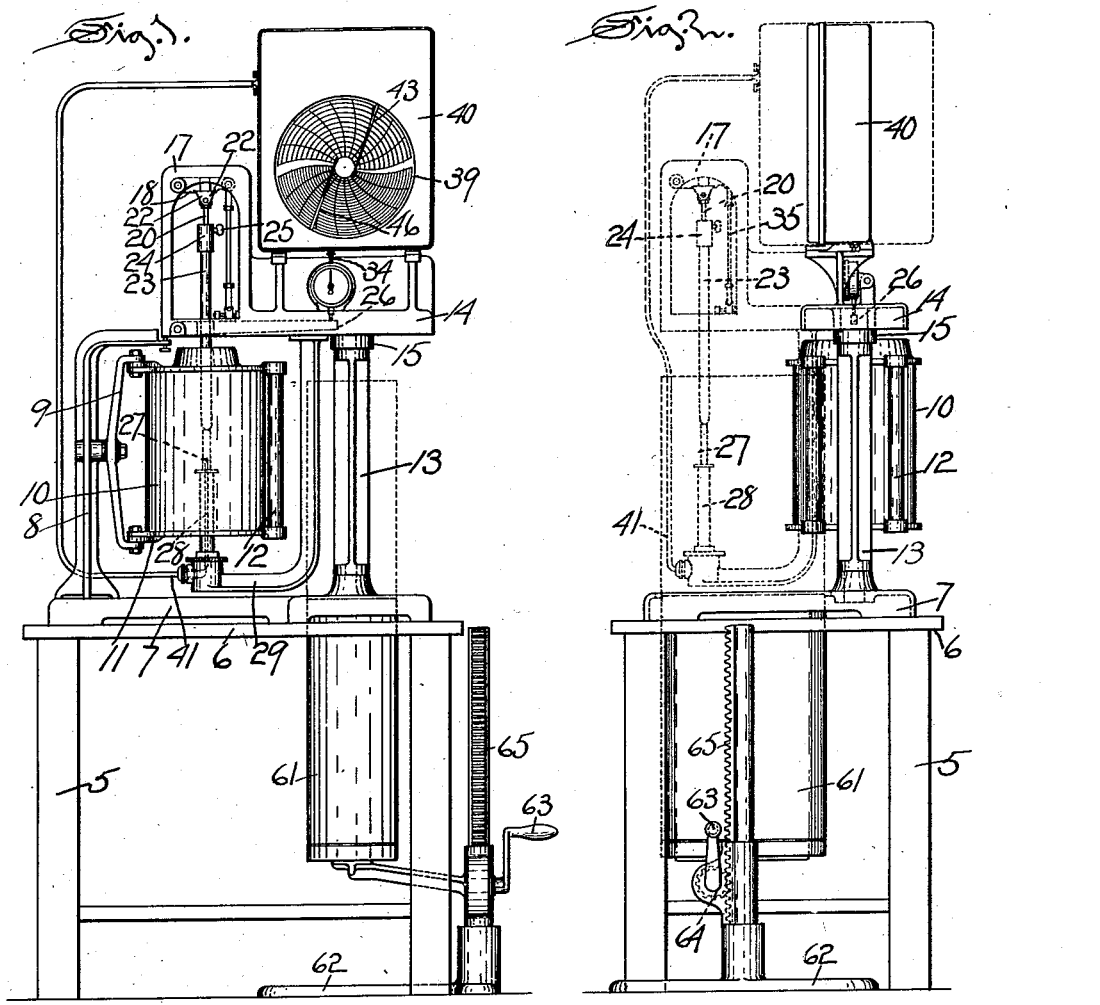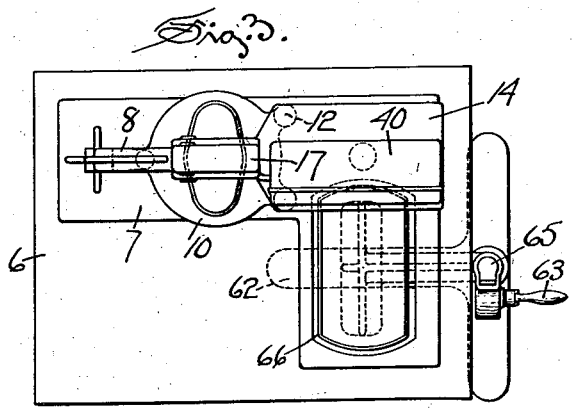

Patented June 16, 1942

2,287,008

UNITED STATES PATENT OFFICE 2,287,008

HEAT TESTING APPARATUS FOR METAL OR SOLID OBJECTS

Stanley P. Rockwell, West Hartford, Conn.; Kenneth W. Weeks, executor of said Stanley P. Rockwell, deceased, assignor to The Stanley P. Rockwell Company, Hartford, Conn., a corporation of Connecticut Application October 20, 1939, Serial No. 300,423

6 Claims. (Cl. 73—51)

My invention relates to that class of instruments which are employed for recording structural changes which take place in the composition of metals, ceramics and other solids during heat treatment thereof, and an object of my invention, among others, is the production of an instrument which will simplify a determination of the results obtained in such heat treatment; a further object of my invention is the production of such an instrument in the use of which definite and substantially accurate records may be obtained of the changes which take place in such heat treatment; a still further object of the invention is the production of means whereby several different phenomena appearing during such heat treatment may be graphed at the same time and upon a single sheet or chart; and a general object of the invention is the production of an instrument that shall be simple in construction and particularly efficient in the results obtained by its use.

One form of an instrument embodying my invention and in the construction and use of which the objects herein set out, as well as others, may be attained, is illustrated in the accompanying drawings, in which—

Figure 1 is a view in elevation of my improved recording instrument.

Figure 2 is a view in elevation looking from a point of view located at the right of the device as shown in Fig. 1.

Figure 3 is a top plan view of the apparatus.

Figure 4 is a view in elevation partially in section on enlarged scale illustrating the recording portion of the instrument.

As is well known, it is common practice to test metals and other solids under heat conditions to determine when the article has been heated to the proper point to be quenched, annealed, normalized, etc., advantage being taken of the well known fact that a piece of steel, when a certain temperature has been reached, changes its structure during what is known as the period of decalescence. It is therefore essential that the temperature of the metal at this time should be known. These tests are made by means of an instrument especially designed for the purpose in order to determine what should be done in the heat treatment of other articles of the same general composition.

For the purpose of such tests instruments have been and are employed to record the temperature of an article at this time when such structural change takes place. As an example, a pyrometer has been used for this purpose and is electrically connected with a pen to move the latter across a rotating chart, the latter being connected for operation by a timing mechanism. In this manner a graph is drawn upon the chart and the latter is lined to denote the time taken for movement from one point to another. An even gradual increase in heat causes an even advance movement of the pen, but when the period of decalescence begins the temperature of the article is reduced and the rate of movement of the pen is lessened and this is denoted by a divergence of the line on the chart. The beginning of the structural change in the article is sudden but the action of saturation of heat by the article is comparatively slow so that a curve takes place in the line made by the pen and consequently the exact time at which the change began is not indicated. In the use of this instrument temperature is graphed against time.

As another example, in order to obtain a more accurate and definite record of the structural change above mentioned a dilation time instrument has been employed which includes a pen operating in connection with a time actuated rotating chart and the pen has been connected with a device as a piece of quartz or other material placed upon the article being heated and the expansion or dilation of the article is thus transferred to the pen to move it across the chart. In this way the exact point of the beginning of the structural change in the article is denoted by instantaneous operation of the pen which produces an angular change in the line at such time, and the time taken to effect such change is noted more prominently on the chart than in the test by the use of the pyrometer recording temperature and time.

In this dilation time test a record of the temperature which is essential is lacking, and to supply this a separate instrument recording or indicating temperature must be employed and to have the two results on a single chart for comparison the graph of the temperature test is transferred to the dilation chart above mentioned. In this manner the exact point of change, the temperature at which such change takes place, and the time taken to produce such temperature may be conveniently compared but this is objectionable owing to liability of error by the inclusion of the human element.

By the use of my improved device a record obtained by graphing temperature against time is made and a record by graphing dilation against time is made both at the same time upon the same chart and by the use of a single test piece only, the following being a description of the instrument taken in connection with the drawings forming a part hereof.

In the accompanying drawings the apparatus is shown as mounted upon a frame comprising legs 5 and a table 6, the latter directly supporting the heating and recording portions of the apparatus. The apparatus comprises a base 7 mounted upon the table 6. A furnace supporting standard 8 is secured to and rises from the base, a yoke 9 being secured intermediate its ends to the standard, as shown in Fig. 1. The furnace comprises two parts 10 separable vertically, preferably at its center, each part having ears 11 at its opposite ends pivotally attached to the ends of the yoke 9. Handles 12 are provided for separating or opening the furnace.

A standard 13 is secured to and rises from the base near that edge opposite the standard 8, this standard 13 supporting a base 14 for recording mechanism hereafter to be described. The base 14 is pivotally attached to the standard 13 as by means of a hub 15 recessed to receive a pivot stud 16 projecting from the upper end of the standard 13, as shown in Fig. 4. The socket in the hub 15 and the stud 16 are comparatively deep and long to provide a substantial bearing to permit the base 14 to be rotated without vibration.

A housing 17 preferably open on its vertical sides rises from the base 14, as shown in Figs. 1 and 4, and a lever 18 is pivotally attached at one end within the upper part of the housing. A seat 19 for the end of a rod 20 is secured to and projects vertically through the lever 18, this seat having a conically shaped recess to receive the conically shaped end of the rod 20 to provide a point bearing. The rod 20 is secured to a head 21 pivotally mounted between ears 22 projecting from the under edge of the lever 18 and the rod 20 is secured to a thrust rod 23 composed of quartz or similar material as by means of a socket 24 and thumb screw 25, as shown in Fig. 4. The rod 23 passes through an enlarged opening in a recording lever 26 pivotally mounted at one end in the base 14. The rod 23 projects downwardly into contact with a test piece 27 which is supported on a rest 67 composed of quartz or like material. A thermocouple 28 extends into a recess formed in the test piece and is supported by an arm 29 projecting downwardly and laterally from the base 14, as shown in Fig. 4. The rest 67 which comprises the immediate support for the test piece is seated on a screw 68 which may be manipulated by a finger piece 69 to effect close and tight contact of the test piece 27 with the rod 23.

The lever 18 is connected by a rod 30 with the recording lever 26 by means of a hinged joint comprising a block 31 mounted upon a screw or screws 32 engaged in lugs 33 projecting from the lever 26, the block 31 being pivotally attached between branches of the forked lower end of the connecting rod 30, as shown in Fig. 4. This adjustable screw connection is for the purpose of changing the point of attachment of the block 31 with the lever 26 whereby the degree of movement of the outer end of the lever by the action of the rod 30 may be varied to adjust the degree of rotation of a chart presently to be described.

A disk actuating rod 34 rests at its lower end upon the recording lever 26, the upper end of said rod bearing a rack 35 the teeth of which mesh with a pinion 36 fast with a gear 37 in mesh with a pinion 38 secured to a recording disk 39 rotatably mounted in the front of a recording housing 40 supported on the base 14, as shown in Figs. 1, 2, and 4.

The thermocouple 28 comprises wires 41 of material common to such instruments and which extend to a temperature recording mechanism 42 mounted in the recording housing 40, this temperature recording mechanism including a recording pan 43 which operates to produce a temperature graph 44, as shown in Fig. 4. This temperature recording mechanism, including the thermocouple 28, is of well known construction and operation and is made by the Bristol Company, of Waterbury, Connecticut, and may be purchased on the market, and a further and detailed description therefore is omitted herein, its construction and operation being well known and understood by those skilled in the art. In the use of this Bristol instrument the mechanism for rotating the chart is omitted, my improved mechanism for rotating the chart being substituted therefor.

A time actuating mechanism 45 is mounted in the housing 40, this timing mechanism including a pen 46 mounted for swinging movement in the housing upon a pivot 47 and operating to produce a graph 48. This timing mechanism is of old and well known construction which has been employed by me in an instrument which is purchasable in the open market and is known as the Rockwell dilatometer. It comprises merely a time train geared to effect a complete rotation of an arbor 49 within a definite period. In this old timing mechanism the recording chart was secured to the arbor 49, but adapting this timing mechanism to the present need the chart is mounted for operation by a dilatation of the test piece as shown in the drawings herein and a cam 50 is secured to the arbor 49, this cam engaging a roller on a pen operating arm 51 fast to a gear 52, the latter meshing with a pinion 53 fast with the pen 46 and operated to swing the pen during the recording operation. In this timing mechanism as changed from my prior dilatometer above referred to the gear 52 is mounted directly on the arbor 49 and is connected with the pen 46 from this point.

During the period of heating the test piece 27 the timing mechanism 45 operates the cam 50 and the latter advances the pen 46 in a radial direction relatively to the disk or chart 39, and the expansion of the test piece, owing to the steadily increasing heat by means of the connection between the rod 23 and the rack 35 and the train of gears connected therewith, rotates the disk or chart, the movement of the pen being governed and effected by the cam 50.

When the stage of decalescence in the test piece begins the transformation in such piece will be recorded on the chart at the point 54 commonly known as $Ac^1$, this point being made by a retrograde movement of the chart owing to contraction of the test piece by reason of the lowering of temperature thereof during its change in structure. At this time, or any other time before or after, the test piece may be quenched or otherwise treated as my be desired by lowering, continuing, or increasing the temperature of said piece and by the use of mechanism to be hereinafter described. After the test piece has passed through the period of decalescence ending at the point 55 commonly known as $Ac^3$, if the heat is not cut off the pen 46 will continue its operation and the chart will rotate up to a period at which the material, if metal, melts but the graph will be at a different angle from that at which it started when the test piece was cold. If, however, the heat is cut off at the point 55a the temperature of the test piece will start to fall and it will also begin to contract at the same time to a point $Ar^3$ denoted by the numeral 57a on the drawings at which time the test piece, if steel, starts to change its structure, heats up, and expands which operation is denoted by the graph on the chart. This change is called the end of the recalescence period which is known as Ar' and which is denoted on the drawings by the numeral 57. After the period of recalescence is ended the pen continues its graphing operation as denoted at 48, its movement being governed by the cam 50. When said cam has made a complete rotation a depression 56 therein will return the pen to its starting point, as shown in Fig. 4.

Some test pieces, depending upon the character of the metal, will be changed in dimensions after cooling from the dimensions originally obtained, and this will be denoted by the record as shown by the spaced lines at the end of the pen 46 in Fig. 4. The graph 48 denotes the time taken for the test piece to reach and pass through the periods of decalescence and recalescence, in this operation expansion and contraction of the test piece being graphed against time.

The curved lines 79 are dimension indicating lines to denote the amount of expansion or contraction of the test piece. These are divided into fifths, each fifth line being more heavily shaded than the others. Any unit of measurement may be taken for use in connection with these lines. I have found thousandths of an inch to be very satisfactory.

The operation of the thermocouple 28 and the temperature recording pin 43 graphs temperature against time to produce the graph 44, the beginning of the decalescent period $Ac^1$ being seen at 58, the point $Ac^3$ at 60, and the beginning of the recalescent period $Ar^3$ being seen at 59 and the ending Ar' of the recalescent period being seen at 58a.

It will thus be seen that the apparatus provides for graphing dilatation against time on the upper half of the chart, for graphing temperature against dilation on the lower half of the chart, and by comparing the two halves of the chart temperature may be plotted against time on the same chart. An essential feature of the invention is that structure wherein changes in size of a test piece during heating and cooling effect rotation of the chart.

By use of the pivot 16 the entire recording mechanism may be swung to one side as shown in dotted lines in Fig. 2, the halves of the furnace being opened wide for this purpose thereby permitting the test piece and its support to be swung to a position over a quenching tank 61 supported on a base 62 and vertically movable by means of a crank 63 operating a pinion 64 in mesh with a rack 65 whereby upon turning the crank the pinion 64 will run up the rack and carry the tank 61 with it in a manner that will be readily understood. As the recording mechanism is swung to one side, as illustrated in dotted lines in Fig. 2, the test piece is positioned over an opening 66 in the table 6 through which opening the tank is raised to envelop and immerse the test piece and the mechanism carrying it in the liquid in the tank. The quenching tank and its operating mechanism are disunited from the recording mechanism so that in quenching the article the recording mechanism is not affected in any way by vibration or jar occasioned by operating the quenching tank.

In accordance with the provisions of the patent statutes I have described the principles of operation of my invention, together with the device which I now consider to represent the best embodiment thereof, but I desire to have it understood that the device shown is only illustrative and that the invention may be carried out by other means and applied to uses other than those above set out.

I claim:

1. A heat testing apparatus for metal or solid objects including a heating device to receive an article to be tested, means within said device to support said article, means engageable with said article for movement thereby under expansion and contraction of said article, a lever operatively connected with said article engageable means for operation thereby, a rotatably mounted chart, a connection between said chart and said lever for operation of the former by movement of the latter, said connection including a disc actuating rod with a rack rigid therewith and a train of gears between said rack and said chart to rotate the latter, a marker engageable with said chart, and means for moving said marker across said chart.

2. A heat testing apparatus for metal or solid objects including a heating device to receive an article to be tested, means within said device to support said article, means engageable with said article for movement thereby under expansion and contraction of said article, a lever operatively connected with said article engageable means for operation thereby, a second pivotally mounted lever operatively connected with the first mentioned lever, a rotatably mounted chart, a rod engageable with said second mentioned lever for operation thereby, said rod having a rack, a geared connection between said rack and said chart for rotation of the latter by the rack, a marker engageable with said chart, and means for moving said marker across said chart.

3. A heat testing apparatus for metal or solid objects including a heating device to receive an article to be tested, means within said device to support said article, means engageable with said article for movement thereby under expansion and contraction of said article, a rotatably mounted chart, a connection between said article engageable means and said chart for rotation of the chart by expansion and contraction of said article, a marker engageable with said chart, means including a cam for imparting timing movement to said marker, and means for rotating said cam.

4. A heat testing apparatus for metal or solid objects including a heating device to receive an article to be tested, means within said device to support said article, means engageable with said article for movement thereby under expansion and contraction of said article, a rotatably mounted chart, a connection between said article engageable means and said chart for rotation of the chart by expansion and contraction of said article, a pivotally mounted marker engageable with said chart, a rotatably mounted cam, a geared connection between said cam and said marker for swinging the latter on its pivot, and means for rotating said cam.

5. A heat testing apparatus for metal or solid objects including a heating device to receive an article to be tested, means within said device to support said article, means engageable with said article for movement thereby under expansion and contraction of said article, a rotatably mounted chart, a connection between said article engageable means and said chart for rotation of the chart by expansion and contraction of said article, a pivotally mounted marker engageable with said chart to produce a mark thereon, a pinion secured with said marker to swing the same on its pivot, a gear engaged with said pinion, a lever secured with said gear, a cam to operate said lever, and means for rotating said cam.

6. A heat testing apparatus for metal or solid objects including a heating device to receive an article to be tested, means within said device to support said article, means engageable with said article for movement thereby under expansion and contraction of said article, a rotatably mounted chart, a connection between said article engageable means and said chart for rotation of the chart by expansion and contraction of said article, a marker engageable with said chart, means for moving the marker across the chart, a base supporting the mechanism hereinbefore described, a pivot upon which said base is mounted for swinging movement thereon, a quenching tank supported apart from said base, and means for imparting vertical movement to said quenching tank to enclose said article and support therefor.

STANLEY P. ROCKWELL.